March 8, 1960

D. L. HINGS 2,927,867

CORROSION AND ABRASION RESISTANT COATING
AND METHOD FOR MAKING SAME
Filed June 23, 1954

INVENTOR.
DONALD L. HINGS

BY Woodling & Krost
Attys.

United States Patent Office 2,927,867
Patented Mar. 8, 1960

2,927,867

CORROSION AND ABRASION RESISTANT COATING AND METHOD FOR MAKING SAME

Donald L. Hings, Vancouver, British Columbia, Canada

Application June 23, 1954, Serial No. 438,701

6 Claims. (Cl. 117—75)

The invention relates to a coating for surfaces which are to be protected, and more particularly corrosion and abrasion resistant coating for metallic surfaces or other surfaces which are disposed to corrode or wear away.

An object of the invention is to provide for a method of applying and binding a thermosetting resin to a surface which is to be protected.

Another object of the invention is to provide for a method of applying and bonding a resin, which is capable of polymerizing to a hard, infusible, thermoset state, to a surface which is to be protected.

Another object of the invention is to provide a method for applying and bonding a thermosetting resin to a metal surface.

Another object of the invention is to provide a thermosetting resin to a surface to be protected by employing a viscous bonding therebetween.

Another object of the invention is to provide for bonding two surfaces together by viscous resin in which the two bonded surfaces constitute a hermetic seal for the viscous resin.

Another object of the invention is to protect a metal surface by first applying a substantially stable non-catalyzed resin to the metal surface, then applying a second coating of a catalyzed thermosetting resin to said first coating and applying a third air excluding coating to the set catalyzed thermosetting resin to seal the catalyzed thermosetting resin from atmosphere.

Another object of the invention is to provide for applying a substantially stable non-catalyzed resin in a viscous state between two hermetically sealed surfaces regardless of whether the hermetically sealed surfaces are curved or flat or in any other form or shape and includes specifically pipe.

Another object of the invention is to provide a surface with a resin which is capable of polymerizing to a hard, infusible state.

Another object of the invention is to provide a metal surface with a resin which is capable of setting up to a hard, infusible state.

Another object of the invention is to provide a protection coating in which a first area portion is at all times viscous and a second area portion is at all times hard.

Another object of the invention is the provision of a protective coating on a metal surface where the metal surface and a portion of the protective coating constitute a hermetic seal for a viscous portion of said coating therebetween.

Another object of the invention is to provide a surface with a thermosetting type coating which will not peel off.

Another object of the invention is a method of hastening the polymerization of the invention by the application of heat.

Other objects and a fuller understanding of this invention may be had by referring to the following description and claims, taken in conjunction with the accompanying drawing, in which:

Figure 1:
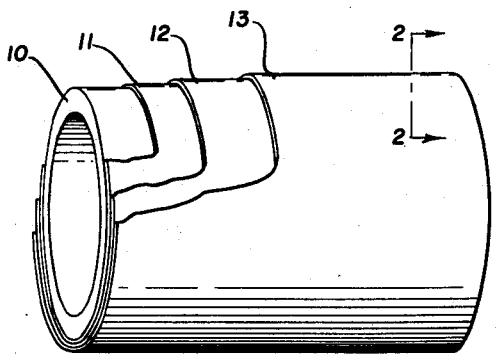
Figure 1 is a side view of a pipe to which the corrosion and abrasion resistant coating may be applied, the various layers of the coating being shown by breakaway surfaces on the left end of the pipe.

The steps involved in illustrating the invention comprise in general a first step of applying a non-catalyzed substantially stable resin as a first coating 11 to a metallic surface of a pipe 10, which resin may also be suitably inhibited or stabilized by the addition of various inhibiting agents, and a second step of applying a second coating 12 on top of the first coating 11. This second coating 12 comprises a substantially stable resin which has been suitably catalyzed and which is capable of setting up or polymerizing to a hard, infusible, thermoset state. This infusible state is reached in some instances by the use of a polymerization catalyst and heat, and in other instances by the use of a polymerization catalyst and accelerator or promoter. In other instances, the use of all three is desirable. A third step comprises the addition of a third coating 13 on top of the second coating 12. The function of this third coating 13 during the polymerization or setting up period of the second coating 12 is to exclude air from the second coating. This third coating 13 may, however, serve other purposes such as an abrasion resistant coat after the setting up period has reached a satisfactory conclusion. The steps give a composite coating having an inside layer 11 which is always viscous and a layer 12 exteriorly of layer 11 which is always hard.

Figure 2:
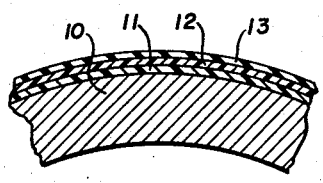
Figure 2 is an enlarged and fragmentary cross-sectional view taken along the line 2—2 of Figure 1.

With specific reference to Figures 1 and 2 of the drawing, I preferably illustrate the invention as being applied to pipe 10 although it is to be understood that the corrosion and abrasion resistant coating may be applied to any surface whether it is flat, circular or in any other shape. The coating is particularly useful in protecting metal pipe which is subject to corrosion and abrasion wear.

The invention is also useful to insulate electrical conducting members which are subject to electrolysis or other voltage breakdown conditions.

In applying the coating to the pipe 10, it is preferable that the surface which is to be protected be chemically clean. One preferred way to clean the pipe chemically is by the application of a flame which at the same time warms the pipe for the subsequent process of applying the coating. It is advantageous to remove all loose particles on the surface although this is not critical.

After the pipe 10 is chemically clean, the first step in my process is to apply the first coating with a substantially stable non-catalyzed resin which is indicated by the reference character 11. The resin is preferably applied when the pipe is warm from being chemically cleaned. The substantially stable non-catalyzed resin is applied in a viscous state and in the invention it remains in a viscous state. In some cases to facilitate the application of the substantially stable non-catalyzed resin, it is preferable that the resin be thinned by a suitable, compatible thinner to reduce the viscosity so that it may be readily sprayed or applied by some other means. This thinner in some cases may actually facilitate the setting up process of the resin to a certain extent, or in other cases it may be merely a solvent. As the coating sets, it naturally becomes more viscous and mechanically stable so that it remains in a firm physical condition and will not drip or run off the pipe; and if one would touch the coating with a finger, it would be described as tacky or as a surface covered with unpolished soft wax.

In practice, it is preferable to use polymerizable unsaturated polyhydric alcohol-polycarboxylic acid polyesters which are the so-called "linear" polyesters, such as those in which there is only very slight cross-linking in the polyester molecules, which is evidenced by the fact that such polyesters are soluble in such solvents as acetone. These polyesters are formed namely by esterification of a dihydric alcohol and a dibasic acid. Such polyesters are really only "substantially" linear since it is not possible to avoid all cross-linking, at least through the unsaturated bonds in the polyester molecule. A suitable commercial example of resin which may be utilized in the first coating 11 is a resin manufactured by Naugatuck Chemicals, a division of Dominion Rubber Co. Ltd., Elmira, Ontario, sold under the caption "Vibrin 117–T Light Stabilized Control No. D–1475."

A typical example of such a polyester is a product prepared by the reaction of an unsaturated dicarboxylic acid such as maleic, fumaric, itaconic, citraconic or mesaconic acid, maleic anhydride is also widely used, with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (in either the alpha or beta position), such as monoformin or monoacetin, any monether of glycerol with a monohydric alcohol, such as monomethylin or monoethylin, or any dihydroxy alkane in which the hydroxy radials are attached to the carbon atoms that are primary or secondary or both, in the series from dihydroxy butane to dihydroxy decane. A suitable polyester may be like that as taught by Patent No. 2,632,752.

Instead of a single polybasic acid, a mixture of polybasic acid may be employed, such as a mixture of an unsaturated dibasic acid with a polybasic acid containing more than two acid radials, such as citric acid. A mixture of polyhydric alcohols may be employed, such as a mixture of dihydric alcohol with a polyhydric alcohol containing more than two alcohol radials, such as glycerol. This is suitably taught by Patent No. 2,632,751.

The polymerizable polyesters of this invention are those which are capable of polymerizing to a hard, infusible state, either by addition polymerization among themselves or also with the help of some other compatible polymerizable monomeric compound. This polymerization is usually brought about with the addition of a suitable polymerization catalyst, and in some conditions a suitable accelerator or as they are sometimes referred to in the art, a promoter, without giving off substantial undesirable by-products during the polymerization reaction.

As described below in the application of the first coating, the provision of excluding a polymerization catalyst from the polyester type resin tends to maintain the resin in a viscous, resinous state. Molecular oxygen, although capable of acting as an inhibitor under certain conditions, is present in the air, and under some conditions may generate peroxides with some of the polymerizable materials. The setting up reaction, with or without these catalytic materials, is relatively slow and merely aids in setting up the resinous material into a firm mechanical state. In essence however, this firm mechanical state is a substantially viscous state as compared to this same polyester type material which has been properly catalyzed, accelerated and polymerized to its hard, infusible state in the second coating. Suitable materials may be incorporated into the polyester type resin to minimize the cross-linking or inhibit addition polymerization. These latter materials are readily recognizable by those skilled in the art and suitable examples are as follows: Hydroquinone, pyragallol, tannic acid or any aromatic amine such as aniline or phenylene diamine. As an example, this is suitably taught by Patent No. 2,532,498.

The second step in the process is the application of the second coating 12 which is applied after the first coating 11 and which serves to exclude the oxygen from the first coating so in essence, the first coating of non-catalyzed resin 11 will be excluded from contact with air and will therefore be maintained in a viscous, tacky state.

In some instances, the polyester type resins contain a thinner or a suitable polymerizable unsaturated monomeric substance. The properties of finished articles produced by polymerization of a composition embodying the invention are better when the composition contains a polymerizable, unsaturated monomeric substance, so that such a substance is ordinarily used in the composition. It is believed that because of their large size the polyester molecules are not mechanically well adapted to polymerize with one another and that the better properties of finished articles produced from a composition containing a polymerizable unsaturated monomeric compound are due to the superior curability of such a composition. The monomeric compound is believed to impart better curability to the composition because of its ability to cross-link the unsaturated polyester molecules by copolymerizing with such molecules.

Examples of suitable polymerizable monomeric compounds include diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis-(allyl silicylate), tetra-(allyl glycolate) silicate, tetra-(allyl lactate) silicate, styrene, vinyl acetate, methyl methacrylate and methyl acrylate.

Examples of suitable solvent type materials are glycol-monomethyl ether, glycol-monoethyl ether and glycol-monobutyl ether. These materials are suitably taught by Patent No. 2,532,498.

The second coating comprises a suitable resin, which has been suitably catalyzed and under some conditions accelerated or promoted and is indicated by the reference numeral 12 in Figure 1. This is applied over the coating of non-catalyzed resin 11. A suitable resin as used by the invention is the type of polyester resin which has been hereinbefore described and which has the ability to polymerize or set to a hard, infusible, thermoset state without evolving objectionable by-products during the polymerization reaction. A suitable commercial example of resin which may be utilized in the second coating 12 may be the type classified as "Vibrin 117–LSC Light Stabilized, Control No. D–1476" made by Naugatuck Chemical Co. mentioned above.

Generally, benzoyl peroxide is used as a polymerization catalyst to effect the cure of polyester type resins at elevated temperatures. Methyl ethyl ketone peroxide catalyst in combination with an accelerator is generally used to effect cure at room temperature. Cobalt naphthenate has been found to be particularly useful as an accelerator when combined with peroxide type catalysts, although other accelerators may be used when special curing systems are required. A suitable commercial example of this accelerator is sold by the Nuodex Products Co., Inc., Elizabeth, New Jersey, under the name "Nuodex" cobalt accelerator.

Other suitable peroxide type catalysts may be used including, succinyl peroxide, tert-butyl perbenzoate, di-tert-butyl perphthlate, acetyl peroxide, peracetic acid, perbenzoic acid, toluyl peroxide, p-bromobenzoyl peroxide, anisoyl peroxide, chloracetyl peroxide, acetyl benzoyl peroxide, diacetyl peroxide, and furoyl peroxide. Certain organic ozonides also increase the rate at which addition polymerization of olefinic double bonds takes place; examples are di-isopropyl ozonide and di-isobutylene ozonide. Organic hydroperoxide polymerization catalysts may also be used; examples are tetralin hydroperoxide, 1 - hydroxy - cyclopentyl - hydroperoxide-1. These suitable catalysts are fully disclosed in Patent No. 2,532,498.

Although any amount of a catalyst sufficient to cause the polymerization to proceed at a reasonable rate can be used in carrying out the polymerization reaction, the usual "catalytic amounts" are normally employed. For example, it is ordinarily advantageous to use an amount of a polymerization catalyst that is at least about 0.05 percent of the composition to be polymerized. It is usually preferable that the amount of catalyst used be at least about 0.1 percent of the composition to be polymerized. Ordinarily, it is advisable that the amount of catalyst used be not more than about 5 percent of the composition to be polymerized, and most desirable that the amount of catalyst be not more than about 3 percent. A suitable commercial example of catalyst is methyl ethyl ketone peroxide in dimethyl phthalate as made by the Lucidal Division, Novadel-Agene Corp., Buffalo, New York, and sold under the name "Lupersol DDM."

This catalyzed thermosetting polyester type resin may be applied by a twin spray wherein one spray applies the thermosetting resin and the other spray applies the suitable catalyst. The spray nozzles are so arranged that the thermosetting resin and the catalyst mix in air just prior to being applied as coating 12. It is found that by mixing the catalyst with the thermosetting resin by twin sprays makes a very convenient method of applying the coating 12, although the invention is brought only in scope to include the direct mixing of the two and applying it with a single spray nozzle provided that necessary caution is taken to apply the mixture prior to its polymerization or setting up period. The coating 12 may also be applied by paint brush or other suitable device. In the event it is desirous to incorporate an accelerator into the resin, the same principle of application may be utilized. Although the description has referred to the layers as a non-catalyzed resin coating and a catalyzed resin coating, these layers may be referred to as first and second area portions.

As the third step, it is preferable to overcoat this second coating 12 with a third air excluding coating indicated by the reference character 13. It has been found that by excluding air from the surface of the thermosetting polyester type resin during its setting up or polymerization period that one is able to obtain a much more uniform and smooth finish. This air excluding overcoat's principal function is to exclude the air from contacting the outer surface of the second coating 12. This air excluding coating may be of several types. Suitable examples constitute the use of either a latex solution or a halogenated rubber mixture. The latex and water dispersions are suspensions of rubber particles in water. The latex solution may be either the natural or synthetic type. After the coating 12 has hardened, this layer may be removed by any suitable means such as washing off with water. Halogenated rubbers are well recognized materials which are available from many commercial sources. They are products obtained by halogenating natural rubber or synthetic rubbers of the diene type such as the copolymers of butadiene and styrene or butadiene and acrylonitrile. The preparation and properties of halogenated rubbers are well known and have been recorded in many publications and patents including the following: Carleton Ellis, "The Chemistry of Synthetic Resins," volume II, Reinhold Publishing Company, Copyright 1935, chapters 54 and 55; and Paul O. Powers, "Synthetic Resins and Rubbers," John Wiley & Sons, Inc., Copyright 1943; and Patent Numbers 2,302,583, 2,401,194 and 2,424,920. Chlorinated natural rubber is much the preferred member of the class of halogenated rubbers. This is produced by the action of chlorine on raw or vulcanized rubber and may contain from thirty percent to eighty percent chlorine, depending on the method of manufacture. The viscosity of the chlorinated rubber may vary widely, but for use in surface coatings, it is preferred to employ a material of relatively low viscosity. These chlorinated rubbers may be taken up in various solvents in order to facilitate their application in many instances. Examples of soluble solvents are benzene, toluene and carbon tetrachloride. An example of a suitable chlorinated rubber mixture for utilization in accordance with this particular invention may be prepared from 4.5 pounds of styrene mixed with 1.5 pounds of chlorinated rubber and thinned with 7.5 pounds of carbon tetrachloride. When latex coatings are used as the air excluding third coat, the latex coating serves specifically no mechanical utility after the thermosetting coating resin is cured or polymerized to its hard infusible state and may subsequently be washed or peeled off. The chlorinated rubber coating, however, provides a very hard surface which is highly resistant to alkaline conditions and is also an excellent electrical insulator.

Additives to increase the flame resistance of the coating may be added. A suitable example of this type of material is sodium bismuthate.

It should be readily recognized that various fillers and coloring agents may be added without altering the scope of this invention.

Figure 3:
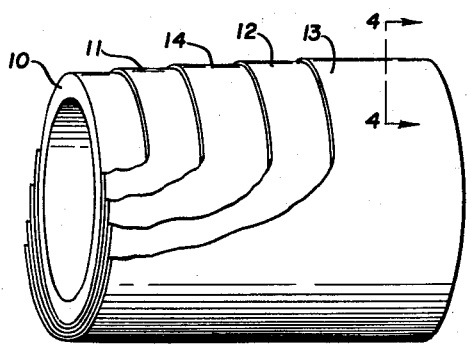
Figure 3 is a view similar to Figure 1 but shows a modified method and form of the coating.
Figure 4:
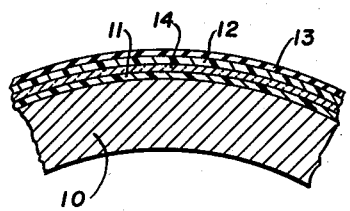
Figure 4 is an enlarged and fragmentary cross-sectional view taken along the line 4—4 of Figure 3.

In Figures 3 and 4, there is shown a modified form of invention in that it includes the same steps as outlined with reference to Figures 1 and 2 plus the additional layer indicated by the reference character 14 which is preferably a wrapping of fiberglass or mica flakes. The purpose of fiberglass may be of two-fold; first, it may gauge the thickness of the entire coating and second, it reinforces the surface for higher impact abrasion.

Figure 5:
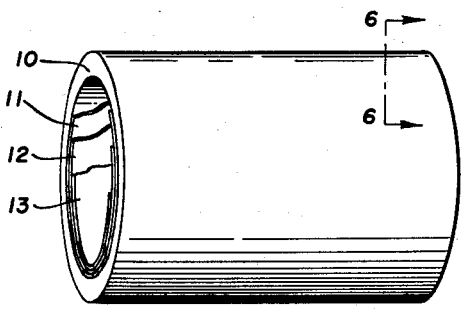
Figure 5 is a view of a pipe showing the corrosion and abrasion resistant coating applied to the inside of a pipe.
Figure 6:
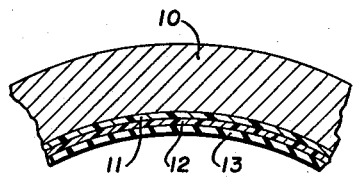
Figure 6 is an enlarged and fragmentary cross-sectional view taken along the line 6—6 of Figure 5.

In Figures 5 and 6, the coating is shown as being applied to the inside of a pipe and being arranged in the same order as that shown in Figures 1 and 2, but it is to be understood that the coating on the inside of the pipe may also include the fiberglass layer as shown in Figures 3 and 4. In Figures 1 to 4, the coating is shown as being on the outside of the pipe; and in Figures 5 and 6, the coating is shown as being on the inside of the pipe, but it is to be understood that a single pipe may have both a coat on the outside and on the inside.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A method of providing a metallic surface with a protective coating comprising the steps of cleaning said surface, applying a first coating to said metallic surface which first coating comprises a substantially stable uncatalyzed unsaturated polyester made by reacting a polybasic alcohol and a di-carboxylic acid together, applying a second coating to said substantially unset first coating which second coating comprises an unsaturated polyester having a catalyst therein to cause polymerization of said polyester to form a synthetic resin, said polyester of said second coating being made by reacting a polybasic alcohol and a di-carboxylic acid together, and applying a third coating to said second coating which third coating comprises a rubber type composition whereby air is prevented from contacting said second coating during polymerization of said second coating.

2. A method of providing a member with a protective coating comprising the steps of cleaning said member, applying a first coating to said member which first coating comprises a substantially stable uncatalyzed unsaturated polyester made by reacting a polybasic alcohol and a di-carboxylic acid together, applying a second coating to said substantially unset first coating which second coating comprises an unsaturated polyester having a catalyst therein to cause polymerization of said polyester to form a synthetic resin, said polyester of said second coating being made by reacting a polybasic alcohol and a di-carboxylic acid together, and applying a third coating to said second coating which third coating comprises a rubber type composition whereby air is prevented from contacting said second coating during polymerization of said second coating.

3. A method of providing a member with a protective coating comprising the steps of applying a first coating to said member which first coating comprises a substantially stable uncatalyzed unsaturated polyester, applying a second coating to said substantially unset first coating which second coating comprises an unsaturated polyester having a catalyst therein to cause polymerization of said polyester to form a synthetic resin, and applying a third coating to said second coating which third coating serves to prevent air from contacting said second coating during polymerization of said second coating.

4. A method of providing a member with a protective coating comprising the steps of applying a first coating to said member which first coating comprises a substantially stable uncatalyzed unsaturated polyester, and applying a second coating to said substantially unset first coating which second coating comprises an unsaturated polyester having a catalyst therein to cause polymerization of said polyester to form a synthetic resin.

5. An article of manufacture comprising a metallic member, a first relatively soft coating layer on said metallic member and comprising a substantially stable non-catalyzed polyester, a second coating layer on said first coating layer and comprising a catalyzed polyester resin, said second coating layer being polymerized to a hard infusible state, said first coating layer forming a viscous bond between said metallic member and said second coating layer, and a third coating layer on said second coating layer for preventing air from contacting said second coating layer and comprising a rubber-type composition.

6. An article of manufacture comprising a member, a first relatively soft coating layer on said member and comprising a substantially stable non-catalyzed polyester, a second coating layer on said first coating layer and comprising a catalyzed polyester resin, said second coating layer being polymerized to a hard infusible state, said first coating layer forming a viscous bond between said member and said second coating layer.

References Cited in the file of this patent

UNITED STATES PATENTS

| | | |
|---|---|---|
| 1,912,372 | Jacobson | June 6, 1933 |
| 2,331,547 | Gessler | Oct. 12, 1943 |
| 2,514,196 | Bradley | July 4, 1950 |
| 2,532,498 | Hoppens | Dec. 5, 1950 |
| 2,609,319 | Boge | Sept. 2, 1952 |
| 2,636,257 | Ford | Apr. 28, 1953 |

FOREIGN PATENTS

| | | |
|---|---|---|
| 415,384 | Great Britain | of 1933 |